United States Patent [19]

Pobud, Jr. et al.

[11] Patent Number: 5,678,839

[45] Date of Patent: Oct. 21, 1997

[54] VEHICLE TRAILER HITCH

[75] Inventors: Teddy Pobud, Jr., Huntington Beach; Yukio Isoda, Torrance, both of Calif.

[73] Assignee: Nissan Motor Corporation U.S.A., Torrance, Calif.

[21] Appl. No.: 439,128

[22] Filed: May 11, 1995

[51] Int. Cl.⁶ .................................................. B60D 1/52
[52] U.S. Cl. .................................................. 280/491.5
[58] Field of Search ........................ 280/491.1, 491.2, 280/491.3, 491.4, 491.5, 504, 506, 511, 457

[56] References Cited

U.S. PATENT DOCUMENTS

| | | | |
|---|---|---|---|
| 2,688,496 | 9/1954 | Shooltz et al. | 280/491.1 |
| 2,978,260 | 4/1961 | Hebeisen | 280/495 |
| 4,204,701 | 5/1980 | Oltrogge | 280/491.1 |
| 4,256,324 | 3/1981 | Hamilton | 280/433 |
| 4,620,736 | 11/1986 | Shanks | 293/116 |
| 4,662,647 | 5/1987 | Calvert | 280/490.1 |
| 4,863,185 | 9/1989 | Coppe | 280/491.2 |
| 5,000,474 | 3/1991 | Kristensen | 280/491.5 |
| 5,016,898 | 5/1991 | Works et al. | 280/433 |
| 5,102,156 | 4/1992 | Fink et al. | 280/495 |
| 5,149,122 | 9/1992 | Helber | 280/491.2 |
| 5,232,240 | 8/1993 | Johnson | 280/491.5 |
| 5,277,448 | 1/1994 | Colibert | 280/491.5 X |
| 5,322,315 | 6/1994 | Carsten | 280/491.5 X |
| 5,344,175 | 9/1994 | Speer | 280/491.5 X |
| 5,423,566 | 6/1995 | Warrington et al. | 280/491.5 X |
| 5,476,279 | 12/1995 | Klemetsen | 280/491.5 X |

OTHER PUBLICATIONS

*Valley Industries*, 1994, Towing Products & Accessories, pp.1–22.

*Primary Examiner*—Kevin Hurley
*Attorney, Agent, or Firm*—Pretty, Schroeder & Poplawski

[57] ABSTRACT

A trailer hitch with a receiver that is angularly mountable relative to the longitudinal axis of the vehicle. A separate mount assembly, including a slide bar and a tongue, interacts with the receiver. The slide bar is receivable within the receiver such that the longitudinal axis of the slide bar is substantially parallel to the longitudinal axis of the receiver. The tongue is mounted to the slide bar and can be adapted to receive a towing accessory or a bicycle support.

30 Claims, 3 Drawing Sheets

VEHICLE TRAILER HITCH

BACKGROUND OF THE INVENTION

1. Field of the Invention

This invention relates generally to trailer hitches for mounting on motor vehicles and, more particularly, to trailer hitches mountable within a limited space.

2. Description of the Related Art

Conventional trailer hitches typically include a receiver tube mounted to a bumper such that the longitudinal axis of the receiver tube is collinear with the longitudinal axis of the vehicle. In some cases, the longitudinally mounted receiver tube is welded to a separate flat plate that is secured to the bumper by bolts. In these conventional hitches, a slide bar, with a tongue extending therefrom is telescopically received within the receiver tube such that the longitudinal axes of the slide bar and the tongue are also collinear with the longitudinal axis of the vehicle.

In the conventional trailer hitch, the slide bar is secured within the receiver tube by a pin inserted through aligned holes in the receiver tube and the slide bar. Further, the distal end of the tongue defines a hole through which the shank of a trailer hitch ball can be inserted to attach the trailer hitch ball to the tongue.

In some vehicle designs, the space behind the rear bumper is limited, for example, by a spare tire mounted underneath the vehicle and adjacent the rear bumper. When the space is too small to receive the entire length of the longitudinally mounted receiver tube, the end of the receiver tube often protrudes beyond the rear bumper of the vehicle. The protrusion of the receiver tube can result in unintentional and painful leg contact. It also increases the bending moment loads to the vehicle structure by moving the trailer ball away from the point at which the hitch frame is mounted to the vehicle. The increased bending moment can require increased frame strength thereby adding additional weight to the vehicle.

Accordingly, there is a need for a trailer hitch with a receiver that can be installed in a limited space without protruding beyond the rear bumper when the hitch is not is use. The present invention addresses this need.

SUMMARY OF THE INVENTION

The present invention is embodied in a vehicle trailer hitch with a receiver that is angularly mountable relative to the longitudinal axis of the vehicle. The trailer hitch also includes a mount assembly with a slide bar that is receivable within the receiver and a tongue mounted to the slide bar. As a consequence of the novel, angular mounting of the receiver, the receiver of the present invention can be installed in a limited space without protruding beyond the vehicle's rear bumper.

More particularly, the present invention includes a receiver that is angularly mountable relative to the longitudinal axis of the vehicle underneath the rear of the vehicle. A detachable mount assembly, including a slide bar and a tongue, couples to the receiver. The slide bar is receivable within the receiver such that the longitudinal axis of the slide bar is substantially parallel to the longitudinal axis of the receiver. The tongue is mounted to the slide bar, preferably, but not necessarily, at any angle substantially perpendicular to a side of the slide bar.

In more detailed embodiments, the tongue is adapted to receive a towing accessory or a bicycle support. In one embodiment, the tongue defines a trailer ball hole through which the shank of a hitch ball can be inserted to mount the hitch ball to the tongue. In an alternative embodiment, the tongue extends from the slide bar and then curves to extend upwardly when the slide bar is received within the receiver. This alternative embodiment can be utilized to support a bicycle or used for other rack applications.

The trailer hitch of the present invention can also include a first pin hole defined through the receiver and a second pin hole defined through the slide bar and adapted for alignment with the first pin hole when the slide bar is received in the receiver. A locking pin passes through the aligned first pin hole and second pin hole to retain the slide bar in the receiver. A prong extending from the receiver and defining a chain hole can also be incorporated for locking the trailer or other object to the vehicle.

In the preferred embodiment, the receiver is a tube and the slide bar is telescopically receivable within the receiver. In this embodiment, the tongue protrudes substantially perpendicularly from adjacent the end of the slide bar and substantially parallel to the underneath of the vehicle when the slide bar is received in the receiver. However, in variations of this embodiment, the tongue can extend either straight out or it can extend outwardly and curve back toward substantially the center of the slide bar. When the latter variation is incorporated, a trailer ball hole defined by the distal end of the tongue is preferably aligned with the center of the receiver and the longitudinal axis of the vehicle.

In an alternative embodiment, the receiver includes a first inverted U-shaped support and a second support generally parallel to the first support. A lock is also included for retaining the mount assembly in the receiver. In this embodiment, the tongue protrudes from substantially the center of one side of the slide bar such that when the mount assembly is received within the receiver, the tongue protrudes through the center of the receiver's U-shaped first support. The first and second supports can be connected by two side walls for additional strength.

In a yet more detailed embodiment, the lock for retaining the mount assembly in the receiver includes a first pin hole defined through one leg of the first inverted U-shaped support and a second pin hole defined through the slide bar and adapted for alignment with the first pin hole when the slide bar is received in the receiver. A locking pin passes through the aligned first and second pin holes of this embodiment to retain a portion of the slide bar in the receiver. The portion side of the slide bar is retained in the receiver by a groove in the other leg of the first inverted U-shaped support and a corresponding projection on the slide bar. To mount the slide bar in the receiver, the projection is inserted into the groove in the receiver and the slide bar is moved toward the closest edge of the first U-shaped support until the slide bar's pin hole is aligned with the receiver's pin hole. Lastly, the locking pin is inserted through the first and second pin holes.

Other aspects and advantages of the present invention will become apparent from the following description of the preferred embodiments, taken in conjunction with the accompanying drawings, which illustrate, by way of example, the principles of the invention.

DESCRIPTION OF THE PREFERRED EMBODIMENTS

Figure 1A:
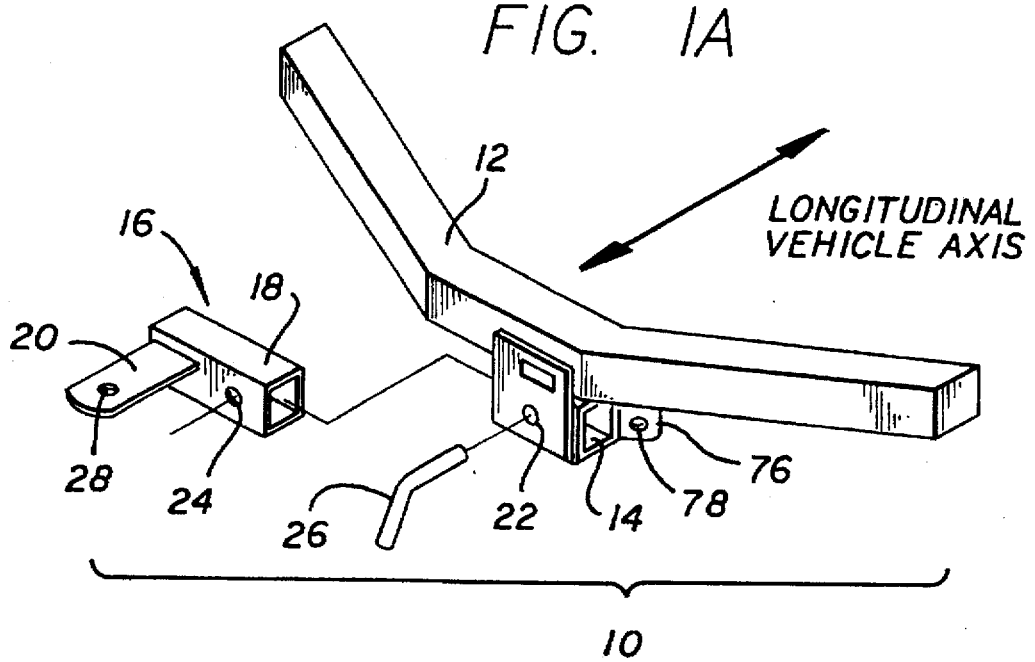
FIG. 1A is a perspective exploded view of a vehicle trailer hitch embodying the invention shown mounted on the cross tube of a hitch frame.

With reference now to the illustrative drawings, there is shown a vehicle trailer hitch 10 shown transversely mounted on the cross tube 12 of a hitch frame (not shown) that can be anchored to a vehicle beneath the rear bumper. The trailer hitch includes a receiver 14 that is angularly mountable on the cross tube relative to the longitudinal axis of the vehicle, and a detachable mount assembly 16. In particular, the receiver illustrated in FIG. 1A is mounted transversely to the longitudinal axis of the vehicle. It is evident from FIG. 1A that the angular mounting of the receiver allows the receiver to be installed in a limited space without protruding beyond the rear bumper. Moreover, the transverse mounting of the receiver as shown in FIG. 1A provides space for a spare tire to be mounted between the rear tires and the rear bumper of a vehicle, without the receiver protruding from the vehicle.

The mount assembly 16 of the present invention includes a slide bar 18 that is receivable within the receiver 14 such that the longitudinal axis of the slide bar is substantially parallel to the longitudinal axis of the receiver. In the preferred embodiment, the slide bar has four rectangular sides and two square ends. However, a triangular slide bar or other shaped slide bar can also be incorporated. The mount assembly also includes a tongue 20 that protrudes from the slide bar substantially perpendicular to the longitudinal axis of the slide bar and substantially parallel to the underneath of the vehicle when the slide bar is received in the receiver. The tongue is shown as extending from a side of the slide bar, however, it can also extend from one end of the slide bar. Further, the tongue is adapted to receive a towing accessory (not shown).

As illustrated in FIG. 1A, in the preferred embodiment the receiver 14 defines a first pin hole 22 and the slide bar defines a corresponding second pin hole 24 that is aligned with the first pin hole when the slide bar is fully received in the receiver. A locking pin 26 is inserted through the first pin hole and the second pin hole to retain the slide bar in the receiver. In another feature of the preferred embodiment, the distal end of the tongue 20 defines a trailer ball hole 28 through which the shank of a hitch ball (not shown) may be inserted to mount the hitch ball to the tongue. In alternative embodiments, other towing accessories, such as a winch, can be welded or otherwise mounted to the tongue.

In the preferred embodiment of the invention, the receiver 14 is a tube that is welded or otherwise mounted to the cross tube 12 of a hitch frame or to the vehicle's bumper. Further, the tongue 20 is mounted substantially perpendicularly to one side of the slide bar 18 near one end. The slide bar is telescopically receivable within the tube of the receiver.

As illustrated in the exploded view of FIG. 1A, to assemble the trailer hitch of the present invention, the end of the slide bar 18 defining the second pin hole 24 is inserted through the receiver tube until the first pin hole 22 is aligned with the second pin hole. Then, the locking pin 26 is inserted through the pin holes to retain the mount assembly 16 in the receiver. The locking pin generally includes a bend, as illustrated, to prevent it from passing completely through the pin holes. When this embodiment of the present invention is assembled, the tongue protrudes from the slide bar substantially perpendicular to the longitudinal axis of the slide bar and substantially parallel to the underneath of the vehicle. Accordingly, the tongue is parallel to the road beneath the vehicle and the shank of a trailer hitch ball can be inserted through the trailer ball hole 28 and a trailer mounted thereto.

Figure 1B:
FIG. 1B is a perspective view of an alternative embodiment of a mount assembly receivable within the receiver illustrated in FIG. 1A.

FIG. 1B illustrates an alternative embodiment of a mount assembly 16A. This embodiment also includes a slide bar 18 and a tongue 20A mounted to a side of the slide bar adjacent one end. The tongue of this embodiment initially extends substantially perpendicular to the longitudinal axis of the slide bar and then curves to extend upwardly when the slide bar is received in the receiver 14, as illustrated in FIG. 1A. Because of the similarity between the slide bar of this embodiment and the slide bar illustrated in FIG. 1A, the mount assembly 16A is received and retained in the receiver 14 in the same manner as the mount assembly 16.

However, the distal end of the tongue 20A illustrated in FIG. 1B is adapted or configured to support a bicycle, a bicycle rack or the like. More specifically, the distal end of the tongue includes a horizontal clamp 29 having a upper arm and a lower arm. Each arm has two channels extending across the arm's width that coordinate with the other arm's channels to hold the tube of two bicycle frames. The arms also include two threaded holes through which screws are threaded to clamp the upper arm to the lower arm. To provide dual support for the bicycle frames, two bicycle rack transverse hitches can be used, or the tongue may be forked to include two, slightly spaced, horizontal clamps (not shown).

Figure 2A:
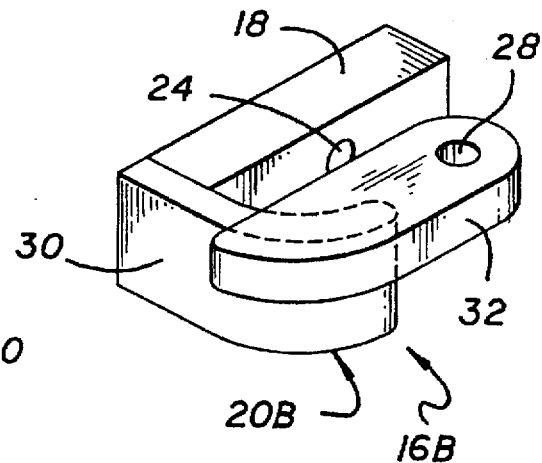
FIGS. 2A and 2B are perspective views of an alternative embodiment of a mount assembly of the vehicle trailer hitch of the present invention.
Figure 2B:
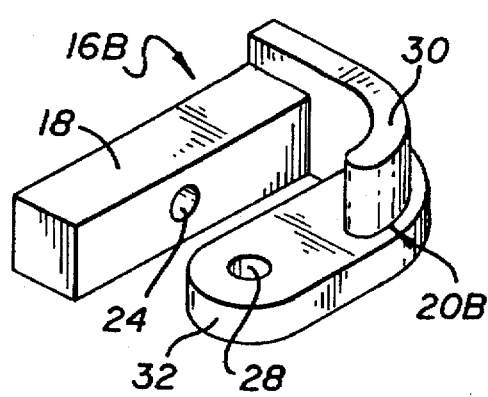

An alternative embodiment of a mount assembly 16B of the invention is illustrated in FIGS. 2A and 2B. In this embodiment, the tongue 20B extends outwardly from one end of the slide bar 18 and curves back toward substantially the center of the slide bar. More specifically, the tongue of this embodiment includes a base 30 that extends outwardly from one end of the slide bar and curves toward the center of the slide bar. The tongue also includes an extension 32 that has two parallel longitudinal surfaces and distance between the parallel surfaces that is less than the height of the slide bar. In other words, the height of the slide bar is greater than the height of the extension.

In this embodiment, the extension 32 is mounted on the distal end of the base 30 such that the distal end of the extension is substantially aligned with the center of the slide bar 18 and such that only one longitudinal surface of the extension is substantially coplanar with the surface of a side of a four-sided slide bar. As with the preferred embodiment, a second pin hole 24 is defined by the slide bar so that a locking pin 26 (FIG. 1A) can be inserted through the first pin hole in the receiver 14 (FIG. 1A) and through the second pin hole to retain the slide bar in the receiver.

The advantage of the mount assembly illustrated in FIGS. 2A and 2B is that the mount assembly 16B can be inserted into the tube of the receiver 14 (FIG. 1A) from either direction. When the mount assembly 16B is inserted from the left in the orientation shown in FIG. 2A, the upper longitudinal surface of the extension 32 is substantially coplanar with the upper longitudinal surface of the slide bar 18. However, when the mount assembly is inserted from the right in the orientation shown in FIG. 2B, the upper longitudinal surface of the extension is below the upper longitudinal surface of the slide bar. This permits the user to choose between two different trailer balls heights simply by inserting the mount assembly into the receiver from different directions.

Figure 3A:
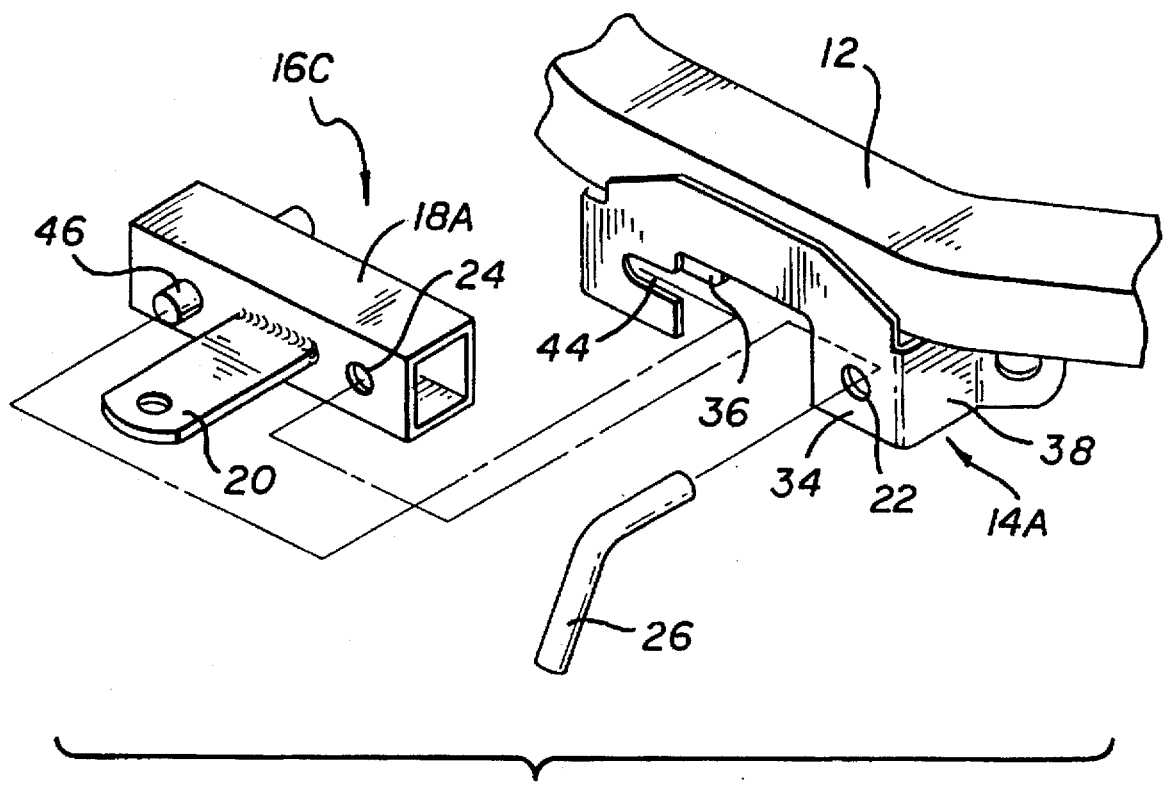
FIG. 3A is an exploded prospective view of an alternative embodiment of the invention, showing the tongue extending from the center of the slide bar.

FIG. 3A illustrates another embodiment of the invention, including a receiver 14A and a mount assembly 16C. In this embodiment, the receiver 14A includes a first inverted U-shaped support 34, shown mounted to the outward side of the cross tube 12 of a hitch frame. The receiver also includes a second support 36 that is mounted generally parallel to the first support and illustrated as mounted to the inward side of the cross tube. This embodiment is also illustrated as having a first side wall 38 connecting one leg of the first support to one side edge (not shown) of the second support and a second side wall 40 (not shown) connecting the opposite leg of the first support to the opposite side edge of the second support. However, the side walls are not a required feature of the receiver 14A, and the first and second supports may be mounted to the cross tube 12 without any other structure connecting them. Additionally, in this embodiment, the distal end of the tongue 20 is substantially coplanar with the end of the tongue mounted to the slide bar such that it extends straight out from the slide bar. Further, the tongue protrudes from substantially the center of a side of a slide bar 18A such that when the mount assembly 16C is received within the receiver, the tongue protrudes through the center of the receiver's U-shaped first support.

The embodiment illustrated in FIG. 3A illustrates the use of a tube, rather than a bar, for the slide bar 18A. Further, this embodiment includes a dual lock for retaining the mount assembly 16C in the receiver 14A. More specifically, this lock includes a first pin hole 22 defined through one leg of the first support 34 and a second pin hole 24 defined through the slide bar 18A and located for alignment with the first pin hole when the slide bar is received in the receiver 14A. A locking pin 26 passes through the aligned first pin hole and second pin hole to retain a portion of the slide bar in the receiver. The other leg of the first support includes a groove 44 which receives a projection 46 that protrudes from the slide bar substantially parallel to the tongue 20 to retain the remaining portion of the slide bar in the receiver.

To assemble the embodiment illustrated in FIG. 3A, the projection 46 is inserted into the receiver's groove 44. Next, the slide bar 18A is generally centered in the receiver 14A until the slide bar's pin hole 24 is aligned with the receiver's pin hole 22. Lastly, the locking pin 26 is inserted through the first and second pin holes. Accordingly, the projection and the groove cooperate to retain the other portion of the slide bar 18A in the receiver 14A.

Figure 3B:
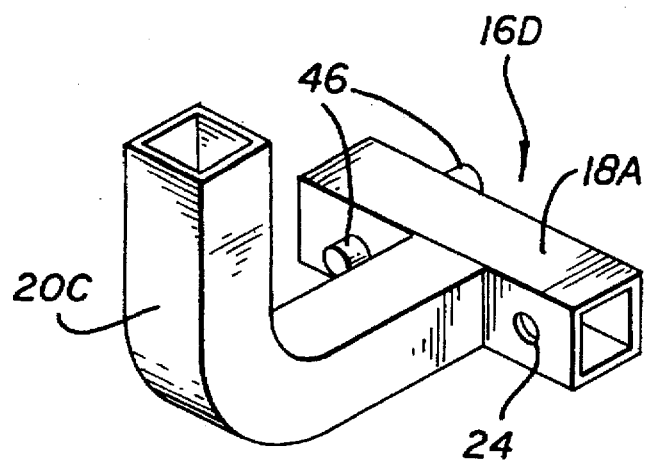
FIG. 3B is a perspective view of an alternative embodiment of a mount assembly receivable within the receiver illustrated in FIG. 3A.

FIG. 3B illustrates another alternative embodiment of a mount assembly 16D adapted for engagement with the receiver 14A illustrated in FIG. 3A. Accordingly, this mount assembly is mounted in the receiver 14A in the same manner as the mount assembly 16C of FIG. 3A. In this embodiment, the slide bar defines a second pin hole 24 cross-wise through the tube and adjacent one end of the slide bar 18A that is located for alignment with the first pin hole 34 (FIG. 3A) in the receiver 14A. Accordingly, a locking pin can be inserted completely through the slide bar. A projection 46 also extends through the slide bar 18A tube such that it projects slightly from opposite sides of the slide bar substantially perpendicular to the longitudinal axis of the slide bar. Both ends of the projection are receivable within corresponding grooves in the receiver for retaining the slide bar in the receiver.

A tongue 20C of mount assembly 16D illustrated in FIG. 3B initially extends substantially perpendicular to the longitudinal axis of the slide bar 18A. Then, the tongue curves such that it extends upwardly when the mount assembly 16D is received in the receiver 14A (FIG. 3A). The tongue 20C is adapted or configured to support a bicycle, a bicycle rack or the like, as shown in FIG. 1B.

Figure 4A:
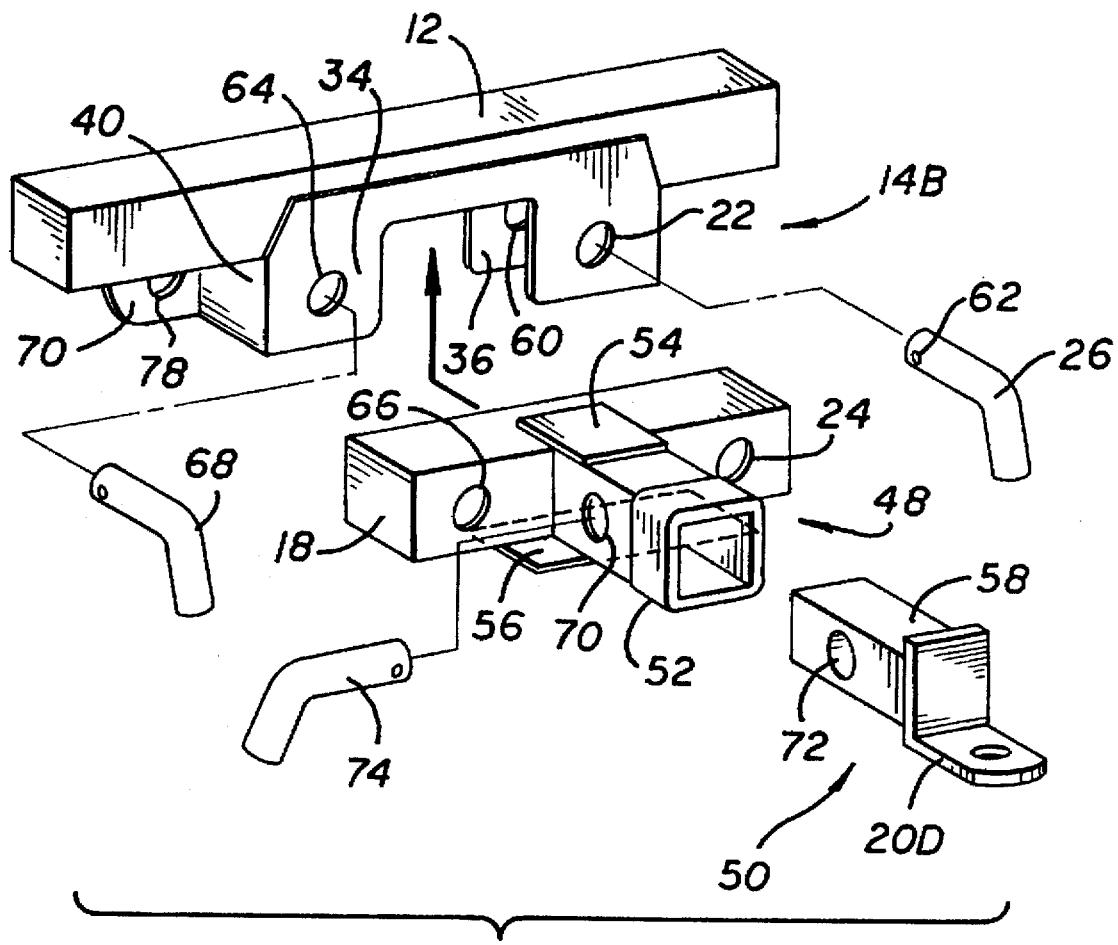
FIG. 4A is an exploded perspective view of an alternative embodiment of the present invention illustrating the incorporation of a tongue support tube and a tongue support bar.

FIG. 4A illustrates yet another detailed embodiment of the invention which includes a receiver 14B, a first mount assembly 48 and a second mount assembly 50. The first mount assembly 48 is received within the receiver, and the second mount assembly 50 is received within the first mount assembly.

This embodiment utilizes a receiver 14B substantially similar to the receiver 14A described with reference to FIG. 3A. For example, in this embodiment the receiver includes a first inverted U-shaped support 34, shown mounted to the outward side of the cross tube 12 of a hitch frame and a second support 36 that is generally parallel to the first support and illustrated as mounted to the inward side of the cross tube.

The embodiment illustrated in FIG. 4A also includes a first side wall 38 (not shown) connecting one leg of the first support to one side edge (also not shown) of the second support and a second side wall 40 connecting the opposite leg of the first support to the opposite side edge of the second support. However, the first mount assembly 48 of FIG. 4A is slightly different from the mount assemblies discussed above. A tongue support tube 52 is mounted to substantially the center of one side of the slide bar 18 substantially perpendicular to the longitudinal axis of the slide bar. Reinforcing gussets 54 and 56 extend from the slide bar to the tongue tube to provide additional support for the tongue support tube. When the first mount assembly 48 is received within the receiver 14B, the tongue support tube protrudes through the center of the receiver's U-shaped first support.

The embodiment illustrated in FIG. 4A also includes the second mount assembly 50 having a tongue support bar 58 that is telescopically receivable within the tongue support tube 52. Further, a tongue 20D is mounted on one end of the tongue support bar 58. The tongue 20D defines a hole for receiving a trailer ball and curves downwardly and outwardly when the tongue support bar is received in the tongue support tube in the manner shown in FIG. 4A. However, the tongue support bar can be rotated in the tongue support tube to change the orientation of the tongue 20D.

The lock for retaining the first mount assembly 48 in the receiver 14B in FIG. 4A is similar to the lock illustrated in FIG. 3A. In this embodiment, the lock includes a first pin hole 22 defined through one leg of the first support 34 and a second pin hole 24 defined through the slide bar 18 and which is located for alignment with the first pin hole when the slide bar is received in the receiver. A second pin holes to retain a portion of the slide bar in the receiver. FIG. 4A also illustrates a pin hole 60 defined through the second support 36 and aligned with the first pin hole 22 to allow the first locking pin to extend through the second support so that a spring clip (not shown) can be inserted through a spring clip hole 62 defined in the end of the first locking pin 26 to prevent the locking pin from sliding outwardly and out of the mount assembly. A bend near the opposite end of the locking pin prevents the locking pin from sliding inwardly and through the mount assembly.

The embodiment illustrated in FIG. 4A also includes an alpha pin hole 64 that extends through the opposite leg of the first inverted U-shaped support from the first pin hole 22. A beta pin hole 66 extends through the slide bar 18 and is adapted for alignment with the alpha pin hole when the slide bar is fully received in the receiver 14B. A second locking pin 68 is used to pass through the alpha pin hole and the beta pin hole to retain the remainder of the slide bar 18 in the receiver.

The tongue support bar 58 is also locked into the tongue support tube 52 by a pin hole and locking pin assembly. More particularly, the tongue support tube defines a first tongue bar pin hole 70 and the tongue support bar defines a second tongue bar pin hole 72 that is adapted for alignment with the first tongue bar pin hole when the tongue support bar is telescopically received in the tongue support tube. A tongue bar locking pin 74 extends through the aligned tongue bar pin holes 70 and 72 to lock the tongue support bar in the tongue support tube.

Although illustrated with other embodiments but not described, the embodiment of FIG. 4A also includes a prong 76 extending from the receiver and defining a chain hole 78. A chain (not shown) can be threaded through the chain hole and through a similar hole in a trailer or other object and held together by a pad lock for locking the object to the vehicle.

Figure 4B:
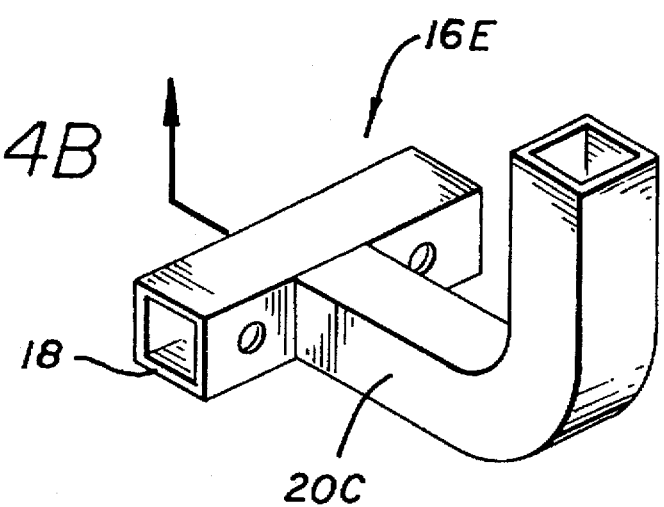
FIG. 4B is a perspective view of an alternative embodiment of a mount assembly receivable within the receiver illustrated in FIG. 4A.

Finally, FIG. 4B illustrates another alternative embodiment of a mount assembly 16E suitable for engagement with the receiver 14B illustrated in FIG. 4A. In this mount assembly, the tongue 20C of mount assembly 16E is mounted to substantially the center of a side of the slide bar 18 substantially perpendicular to the longitudinal axis of the slide bar. As with the mount assemblies of FIGS. 1B and 3B, the tongue of FIG. 4B curves to extend upwardly when the slide bar is received in the receiver 14B as illustrated in FIG. 4A.

It should be appreciated from the foregoing description that the present invention provides an improved vehicle trailer hitch. As illustrated in each embodiment, when the receiver is mounted transversely to the longitudinal axis of the vehicle, the receiver can fit into a space as narrow as cross tube of a hitch frame. Accordingly, the receiver of the present invention can be installed in a limited space without protruding beyond the rear bumper when the hitch is not is use. However, the wide variety of mount assemblies and receivers illustrate that this invention can be used on many different vehicles.

Although the present invention has been described in detail with reference to the presently preferred embodiment, it will be appreciated by those of ordinary skill in the art that various modifications can be made without departing from the invention. For example, although the trailer hitch 10 is illustrated as mounted transversely to the longitudinal axis of the vehicle, it can be mounted at any angle relative to the longitudinal axis of the vehicle without departing from the present invention. The embodiments illustrated in FIGS. 1A and 1B are particularly suited for other angular mountings. Additionally, the first support of the receiver illustrated in FIGS. 3A and 4A can be formed from shapes other than an inverted U or it can be formed from two separate legs that are not connected in the center. Further, although described only with reference to FIG. 4A, a prong 76 and a chain hole 78 can be utilized on one or both sides of the receiver. Additional welded reinforcing patches can also be incorporated to provide additional strength to the trailer hitch. Finally, additional spring clips can be used for retaining locking pins in their assembled positions can be used without departing from the invention. Accordingly, the invention is defined only by the following claims.

We claim:

1. A trailer hitch for attachment to a vehicle, comprising:
    a receiver that is angularly mountable in a fixed position relative to the longitudinal axis of the vehicle underneath the rear of the vehicle such that when the receiver is mounted, the longitudinal axis of the receiver is substantially parallel with the underneath, of the vehicle, the receiver having at least one opening that is mountable substantially near the longitudinal axis of the vehicle; and
    a mount assembly including
        a slide bar receivable within the receiver such that the longitudinal axis of the slide bar is substantially parallel to the longitudinal axis of the receiver and angularly oriented relative to the longitudinal axis of the vehicle, and
        a tongue mounted to the slide bar such that when the slide bar is received in the receiver, the tongue extends out of the at least one opening of the receiver and the distal end of the tongue is located substantially near the longitudinal axis of the vehicle.

2. The trailer hitch of claim 1, wherein the tongue extends from the slide bar substantially perpendicular to the longitudinal axis of the slide bar and substantially parallel to the underneath of the vehicle when the slide bar is received in the receiver.

3. The trailer hitch of claim 2, wherein the tongue is adapted to receive a towing accessory.

4. The trailer hitch of claim 2, wherein the tongue defines a trailer ball hole.

5. The trailer hitch of claim 1, wherein the slide bar has four sides.

6. The trailer hitch of claim 1, wherein:
    the receiver defines a first pin hole;
    the slide bar defines a second pin hole adapted for alignment with the first pin hole when the slide bar is received in the receiver; and
    the hitch further includes a locking pin adapted to pass through the first pin hole and the second pin hole to retain the slide bar in the receiver.

7. The trailer hitch of claim 1, further comprising a prong extending from the receiver, the prong defining a chain hole.

8. The trailer hitch of claim 1, wherein:
    the receiver is a tube; and
    the slide bar is telescopically receivable within the receiver.

9. The trailer hitch of claim 8, wherein the tongue protrudes substantially perpendicularly from a side of the slide bar, adjacent an end.

10. The trailer hitch of claim 1, wherein:
    the receiver includes
        a first inverted substantially U-shaped support,
        a second support generally parallel to the first support, and
        a lock for retaining the mount assembly in the receiver; and
    the tongue protrudes substantially perpendicularly from substantially the center of a side of the slide bar such that the tongue protrudes through the center of the receiver's U-shaped first support when the mount assembly is received within the receiver.

11. The trailer hitch of claim 10, wherein the slide bar includes a tube.

12. The trailer hitch of claim 10, wherein the receiver further comprises:

a first side wall connecting one leg of the first support to one side edge of the second support; and a second side wall connecting the opposite leg of the first support to the opposite side edge of the second support.

13. The trailer hitch of claim 10, wherein the distal end of the tongue is substantially coplanar with the end of the tongue mounted to the slide bar.

14. The trailer hitch of claim 10, wherein the tongue extends outwardly from the slide bar and curves to extend upwardly when the slide bar is received in the receiver.

15. The trailer hitch of claim 10, wherein the lock comprises:

a first pin hole defined through one leg of the first inverted U-shaped support;

a second pin hole defined through the slide bar and adapted for alignment with the first pin hole when the slide bar is received in the receiver;

a first locking pin adapted to pass through the first pin hole and the second pin hole to retain a portion of the slide bar in the receiver;

an alpha pin hole defied through the opposite leg of the first inverted U-shaped support;

a beta pin hole defined through the slide bar and adapted for alignment with the alpha pin hole when the slide bar is received in the receiver; and a second locking pin adapted to pass through the alpha pin hole and the beta pin hole to retain the remainder of the slide bar in the receiver.

16. The trailer hitch of claim 10, wherein the lock comprises:

a first pin hole defined through one leg of the first inverted U-shaped support;

a second pin hole defined through the slide bar and adapted for alignment with the first pin hole when the slide bar is received in the receiver;

a locking pin adapted to pass through the first pin hole and the second pin hole to retain a portion of the slide bar in the receiver;

a groove defied in the other leg of the first inverted U-shaped support; and a projection that protrudes from the slide bar substantially parallel to the tongue and is adapted to cooperate with the groove to retain the remainder of the slide bar in the receiver.

17. The trailer hitch of claim 16, wherein the tongue extends from the slide bar substantially parallel to the underneath of the vehicle when the slide bar is received in the receiver.

18. The trailer hitch of claim 17, wherein the tongue is adapted to receive a towing accessory.

19. The trailer hitch of claim 17, wherein the tongue defines a trailer ball hole.

20. The trailer hitch of claim 16, wherein the tongue extends outwardly from the slide bar and curves to extend upwardly when the slide bar is received in the receiver.

21. The trailer hitch of claim 20, wherein the tongue is adapted to support a bicycle.

22. The trailer hitch of claim 16, further comprising a prong extending from the receiver, the prong defining a chain hole.

23. A trailer hitch for attachment to a vehicle, comprising:

a receiver that is angularly mountable relative to the longitudinal axis of the vehicle underneath the rear of the vehicle; and a mount assembly including a slide bar receivable within the receiver such that the longitudinal axis of the slide bar is substantially parallel to the longitudinal axis of the receiver, and a tongue mounted to the slide bar, the tongue extending outwardly from the slide bar and curving to extend upwardly when the slide bar is received in the receiver.

24. The trailer hitch of claim 23, wherein the tongue is adapted to support a bicycle.

25. A trailer hitch for attachment to a vehicle, comprising:

a receiver in the form of a robe that is angularly mountable relative to the longitudinal axis of the vehicle underneath the rear of the vehicle; and a mount assembly including a slide bar that is telescopically receivable within the receiver such that the longitudinal axis of the slide bar is substantially parallel to the longitudinal axis of the receiver, and a tongue mounted to the slide bar, the tongue extending outwardly from a side of the slide bar, adjacent an end, and curving back toward substantially the center of the slide bar.

26. The trailer hitch of claim 25, wherein the tongue comprises:

a base extending outwardly from the slide bar and curving toward the center of a first side of the slide bar substantially parallel to the underneath of the vehicle when the slide bar is received in the receiver; and an extension with two parallel longitudinal surfaces and distance between the parallel surfaces that is less then the height of the slide bar, the extension being mounted on the distal end of the base such that the distal end of the extension is aligned with substantially the center of the slide bar and such that only one longitudinal surface of the extension is substantially coplanar with the longitudinal surface of the first side of the slide bar.

27. The trailer hitch of claim 25, wherein:

the receiver defines a first pin hole;

the slide bar defines a second pin hole adapted for alignment with the first pin hole when the slide bar is telescopically received in the receiver; and the hitch further includes a locking pin adapted to pass through the first pin hole and the second pin hole to retain the slide bar in the receiver.

28. The trailer hitch of claim 27, further comprising a prong extending from the receiver, the prong defining a chain hole.

29. A trailer hitch for attachment to a vehicle, comprising:

a receiver in the form of a tube that is angularly mountable relative to the longitudinal axis of the vehicle underneath the rear of the vehicle; and a mount assembly including a slide bar that is telescopically receivable within the receiver such that the longitudinal axis of the slide bar is substantially parallel to the longitudinal axis of the receiver, and a tongue mounted to the slide bar, the tongue extending outwardly from a side of the slide bar, adjacent an end, and curving to extend upwardly when the slide bar is received in the receiver.

30. A trailer hitch for attachment to a vehicle, comprising:

a receiver tube that is angularly mountable relative to the longitudinal axis of the vehicle underneath the rear of the vehicle, the receiver defining a first pin hole therethrough and having a prong extending from the receiver, the prong defining a chain hole;

a mount assembly including
- a slide bar that is telescopically receivable within the receiver such that the longitudinal axis of the slide bar is parallel to the longitudinal axis of the receiver, the slide bar defining a second pin hole therethrough adapted for alignment with the first pin hole when the slide bar is received in the receiver,
- a tongue that extends outwardly from one end of the slide bar and curves back toward the center of the slide bar, the tongue being substantially parallel to the underneath of the vehicle when the slide bar is received in the receiver and the tongue including a trailer ball hole; and
- a locking pin adapted to pass through the first pin hole and the second pin hole to retain the slide bar in the receiver.

* * * * *